United States Patent [19]

McLaughlin et al.

[11] Patent Number: 5,098,577
[45] Date of Patent: Mar. 24, 1992

[54] METHOD FOR CONTACTING ACTIVE MATERIAL WITH LIQUIDS AND SEPARATING SAME

[75] Inventors: John R. McLaughlin, Media, Pa.; Fredric A. Wright, Chattanooga, Tenn.

[73] Assignee: PQ Corporation, Valley Forge, Pa.

[21] Appl. No.: 638,926

[22] Filed: Jan. 9, 1991

[51] Int. Cl.$^5$ ............................................. B01D 15/00
[52] U.S. Cl. ................................. 210/679; 210/694; 210/502.1; 210/506
[58] Field of Search .................... 210/679, 694, 502.1, 210/504, 506

[56] References Cited

U.S. PATENT DOCUMENTS

| | | | |
|---|---|---|---|
| 3,536,615 | 10/1970 | Bunn | 210/502.1 |
| 4,435,366 | 3/1984 | Heitkamp et al. | 210/675 |
| 4,486,481 | 12/1984 | Heitkamp et al. | 210/502.1 |

*Primary Examiner*—Ivars Cintins
*Attorney, Agent, or Firm*—Ernest G. Posner

[57] ABSTRACT

Active or functional materials such as adsorbents, catalysts, defoamers and the like are combined with inert low density particles, preferably hollow microspheres, to provide a functional material of controlled density. This product is introduced into a liquid with a somewhat higher density under agitation for a time sufficient to accomplish the desired function. Then agitation is stopped and the spent product floats to provide easy separation.

4 Claims, No Drawings

METHOD FOR CONTACTING ACTIVE MATERIAL WITH LIQUIDS AND SEPARATING SAME

BACKGROUND OF THE INVENTION

This invention relates to contacting active materials such as adsorbents, catalysts, defoamers and ion exchangers with liquids, and their separation from them. Essentially the invention provides an inert particle coated with the functional material forming a composite that has a density somewhat less than the liquid. Said composite particles are introduced into the liquid under agitation and allowed to function; then when agitation is stopped, the composite particles collect at the top of the liquid and they can be easily separated from it.

Many liquids contain trace impurities that must be removed prior to use and/or storage. There are a number of problems associated with such processes. In order to reduce the time necessary to remove the impurity, the agent should have a high surface area and be finely divided. The contact between the liquid and the agent should be maintained with minimal effort such as moderate agitation. To accomplish such contact the density of the agent should not be substantially different from the liquid. Separation of these finely divided materials from the liquid is often difficult since they tend to agglomerate on filters and blind them.

It is an object of this invention to provide active materials in a form that provides easily achieved contact between the active material and the liquid and maintains the necessary high surface area, but allows easy separation from the liquid. It is a further object of this invention to provide the active agent as a coating on a particle that has a density less than that of the liquid.

SUMMARY OF THE INVENTION

The product of our invention is a composite particle of 60 to 90% of the density of the liquid to be treated. The particle consists of an inert particle of controlled density, a coupling layer and an outer coating of functional materials. The inert particle can be porous and/or hollow but is usually a hollow microsphere. If the particle is porous, the coupling or adhesive layer must reduce or stop penetration of the liquid to be treated into the particle. The coupling layer can be of any material that will allow the functional material to adhere to the core particle. The functional coating or layer can be any material that will provide the functionality desired and can be provided in a finely divided form usually with an average particle size of 20 microns or less.

The composite of our invention has a density of 60 to 90% of the liquid to be treated so that upon moderate agitation it becomes suspended in the liquid and remains in contact with the liquid until the agitation is stopped. The now spent composites float to the top of the liquid for easy separation.

THE INVENTION

The core particle of our invention can be any material that is relatively inert and has a density of about 0.1 to about 0.9 g/cc. The density must be adjusted or selected so that it is less than the density of the liquid to be treated. Any type of relatively inert particles is useful to prepare the product of our invention. Porous materials are useful if the subsequent treatment reduces the porosity, but we prefer hollow materials, and we especially prefer hollow microspheres.

The hollow microspheres suitable for use include a wide variety of commercially available materials. These microspheres have average particle sizes ranging from about 60 microns to about 180 microns. Individual particles or microspheres may have larger or smaller particles. We prefer average particle sizes of about 100 to about 180 microns and we most prefer average particle sizes of about 100 to about 150 microns. In general, larger hollow microspheres are less dense, so such large particles may be loaded with more of the active material than smaller particles.

Hollow fly ash spheres including cenospheres are useful to produce the product of our invention. Such materials exhibit high compressive strength and can withstand the process required to produce the composite material and withstand use of said material in a liquid to be treated. Such hollow fly ash cenospheres are articles of commerce which are recovered from the ash of coal-fired power plants.

The core particles used to make the product of our invention, including hollow microspheres and fly ash microspheres, should be substantially water free. The mass of core particles is mixed with a binder adhesive. In general, the binder should constitute about 2 to about 15% of the final product. In particular, since the binder adhesive is not functional, as little as possible, such as 2 to 10%, should be used. We most prefer about 2 to about 4%.

Any adhesive that will coat the inert core particles and bind the functional material, and can be applied so that agglomeration of the core particles is minimized can be used. The choice of binder will be determined by the type of liquid in which the particles will ultimately be dispersed. The binder adhesive must not be soluble in the liquid or react with it, as the active material will be required to adhere to the substrate microsphere during contact with the liquid.

Many coating resins, both water and solvent-based, are quite suitable for this function. We prefer water-based coating resins because of the low amount of volatile organic compounds evolved during their cure. Latex and latex resins modified with other polymers are suitable for this application, as are water-based polyester dispersions. A most exemplary binder is a water-based urethane emulsion. More particularly, NL Chemicals' Spensol L-54 has been found to be most effective because of its chemical resistance and excellent film-forming characteristics.

In applications where these water-based binders might be attacked by the liquid in which the coated particles are suspended, a solvent-based coating resin will often be chosen. An exemplary binder is a solvent-based polyester baking enamel of the thermosetting type. More particularly, Cargill's 2387 has been found to be quite effective.

Other types of suitable binders are the high-solids and 100% non-volatile thermosetting resins, such as acrylics, polyesters, vinyl esters, and epoxies. A highly favored system of this type is an organofunctional silane having an organoreactive radical function that can be polymerized at elevated temperature along with a reactive diluent. The diluent extends the silane and copolymerizes with it. The inorganic portion of the silane attaches to the inorganic particle or microsphere at lower temperatures by a hydrolysis reaction. The organic reactive portion of the silane reacts, polymerizes or copolymerizes and bonds the functional particles to the surface of the particle or microsphere.

An exemplary organofunctional silane among others is 3[2(vinyl benzylamino) ethylamino] propyl trimethoxysilane. Copolymerizable constituents include, for example, various lactones, a particular lactone being gamma-butyrolactone.

The average particle size of the functional particles attached to the core particles or microspheres by means of the binder adhesive should be less than about 25 microns. Preferably it should be less than about 10 microns. We prefer about 0.4 to about 10 microns. If the particles are too small they become embedded in the adhesive binder. If the particles are too large, they will not adhere properly to the core particles, and will be rubbed off mechanically during processing or possibly never become attached at all. The particles can have any functionality desired. They can be ion exchangers, adsorbents, absorbents, defoaming agents or catalysts, among others. Examples of such materials include activated carbon, zinc oxide, silica gel, magnesium oxide, magnesium silicate, polyvinyl polypyrollidone, zeolite, ferrite, hydrophobic silica, silica supported metal organic polymer, aluminophosphate, silica supported metal oxide catalysts, silica-titania co-gels, and metal phosphate catalysts, among others.

The process by which the functional composite products of our invention are produced is as follows. A quantity of the inert core particles, such as hollow microspheres, is vigorously blended with the adhesive binder until the particles or microspheres are coated with the binder. Then the functional particles are added to the coated particles or microspheres until the coated particles are completely covered with the functional material. The adhesive binder is then cured. If the binder is a thermoset material, the curing is achieved by heating. Agitating and tumbling are continued throughout this process until the product is dry, cured and/or cooled and then recovered.

The product of our invention comprises:
  10–35% functional materials
  2–15% adhesive binder
  55–87% core particles such as microspheres The density of our product is 0.5 to 0.9 g/cc. The products may require further treatment if the functional materials require activation or other chemical manipulation. Calcination, regeneration, ion exchange and metal impregnation are examples of some of these steps that may be required.

The products of our invention have many functionalities and can therefore be used for several purposes with many liquids; however, the manner of use is about the same. The coated microsphere is selected for functionality and density. It must carry out the function, such as adsorbing an impurity or catalyzing a reaction and must have a density that is 60 to 90% of the liquid. The liquid is agitated and the product added. The agitation is adjusted to prevent the product from floating near the top surface of the liquid. Agitation is continued until the impurity has been adsorbed or the reaction catalyzed. Upon cessation of agitation, the liquid becomes quiescent and the spent product floats to the top of the liquid and can be separated therefrom.

The products of our invention can be used in many ways. Some of the uses include removing trace elements from contaminated bodies of water such as ponds and lagoons, removing dissolved oxygen from beer and beverages in the processing plant, removing excess tannins from wines while in fermenters, catalyzing reactions and other functional processes. Products that have been rendered hydrophobic can be used as defoamers in process tanks.

EXAMPLES

The following examples illustrate certain embodiments of our invention. These examples are not provided to establish the scope of the invention, which is described in the disclosure and recited in the claims. The proportions are in parts by weight (pbw) or percent by weight (% wt/wt) unless otherwise indicated.

EXAMPLE 1

Six hundred pbw of Extendospheres SG hollow ceramic microspheres from PQ Corporation were placed in the mixing bowl of a planetary mixer equipped with electric heating bands. The mixer was adjusted to provide a slow but thorough agitation of the microspheres. A mixture of 50 pbw of polyester baking enamel 2378, obtained from Cargill Incorporated and 50 pbw xylene (xylol) was slowly added to the microspheres. Agitation was continued until the microspheres were fully wet out. Two hundred forty pbw of Valfor ® 100 zeolite from PQ Corporation was then slowly added to the wet-out microspheres until a uniform-appearing coating was effected. The microspheres were slowly heated until a temperature of 230° F. was reached. The heating was continued and the temperature maintained until the zeolite-coated microspheres appeared dry, and no detectable odor of xylene was present. Heating was discontinued and agitation slowed further. The product was allowed to cool to ambient temperature. The coated microspheres were then removed from the mixer bowl and sieved through a U.S. Standard 20 mesh 8 inch test sieve to remove the small amount of agglomerates present. Eight hundred forty pbw of final product was recovered. The product appeared to be well coated with the white Valfor 100, and had a true density of 0.841 g/cc. The product exhibited free-flowing characteristics, and was off-white in color.

EXAMPLE 2

Three hundred pbw of Extendospheres SG ceramic microspheres were placed in a planetary mixer equipped with electric heating bands. The mixer was adjusted to give a slow but thorough agitation of the microspheres. Fifty pbw of Spensol L54 urethane emulsion from NL Spencer Kellogg Inc. was mixed with 12 pbw of water. Approximately ⅓ of this mixture was slowly added to the microspheres under agitation. The microspheres began to take on a damp appearance. Seventy pbw of Carbon A-1 (activated carbon from the Calgon Corporation) was placed in a beaker, and approximately one third of this powder was added to the damp microspheres in the mixer. The microspheres began to appear dry. Another third of the L54/water mixture was added to the microspheres as agitation continued, until the microspheres appeared damp, and then another third of the Carbon A-1 was added. The microspheres again appeared to dry out. The rest of the L54/water mixture was then added, and the rest of the Carbon A-1 was added after the damp appearance was once again achieved. The microspheres still appeared to be somewhat damp. The coated microspheres were slowly heated until a temperature of 212° F. was reached. This temperature was maintained until the carbon-coated microspheres appeared to be dry, and no more steam appeared. Heating was discontinued and agitation slowed even further. The product was allowed to cool to ambient temperature. The coated microspheres were then removed from the mixer bowl and sieved through a U.S. Standard 20-mesh 8-inch test sieve to remove the agglomerates present. Three hundred thirty-six pbw of final product was recovered. The product appeared to be well coated with the carbon. The color was black. The product exhibited a true density of 0.761 g/cc, and was free flowing.

EXAMPLE 3

One hundred pbw of Extendospheres SG hollow microspheres were placed in a polypropylene beaker. Eight pbw of Spensol L54 urethane emulsion was mixed with 2 grams of water in another beaker. Approximately ⅓ of this mixture was added to the microspheres, and a spatula was used to agitate them vigorously. The microspheres began to take on a damp appearance. Twenty-three pbw of fine-grade alkylstyrene copolymer imbiber beads were placed in another beaker, and approximately one third of this powder was added to the damp microspheres in the beaker. The microspheres began to appear dry. Another third of the L54/water mixture was added to the microspheres, agitation was again performed until a damp appearance was effected, then another third of the imbibers was added. Agitation was once again initiated, and the microspheres again appeared to dry out. The rest of the L54/water mixture was then added, the microspheres agitated, and the rest of the imbibers was added after the damp appearance was once again achieved. The microspheres, which appeared to be somewhat damp, were heated in a shallow layer in a convection oven. The temperature control was set at 250° F., and the coated microspheres were allowed to dry thoroughly with occasional stirring. The product was removed from the oven and allowed to cool to ambient temperature. The coated microspheres were then removed from the baking pan and sieved through a U.S. Standard 20-mesh 8-inch test sieve to remove the agglomerates present and 115.6 pbw of final product was recovered. The product appeared to be well coated with the alkylstyrene copolymer. The product had an off-white color, and was free flowing. True density was 0.855 g/cc.

EXAMPLE 4

One hundred pbw of Extendospheres SG hollow microspheres were placed in a polypropylene beaker. Eight pbw of Spensol L54 urethane emulsion was mixed with 2 pbw of water in a beaker. Approximately ⅓ of this mixture was added to the microspheres, and a spatula was used to agitate them vigorously. The microspheres began to take on a damp appearance. Forty pbw of QUSO WR55 hydrophobic silica from PQ Corporation was placed in a beaker, and approximately ⅓ of this powder was added to the damp microspheres in the beaker. Sufficient methanol was added to wet out the QUSO. Agitation was continued until the microspheres began to appear dry. Another third of the L54/water mixture was added to the microspheres, agitation was again performed until a damp appearance was effected, then another third of the QUSO WR55 silica was added. Agitation was once again initiated, and sufficient methanol was introduced to wet out the QUSO. The last third of the L54/water mixture was then added, the microspheres agitated, and the last third of the silica was added after the damp appearance was once again achieved. The microspheres, which appeared to be somewhat damp even with considerable agitation, were heated in a shallow layer in a laboratory convection oven. The temperature control was set at 250° F., and the coated microspheres were allowed to dry thoroughly with occasional stirring. The product was removed from the oven and allowed to cool to ambient temperature. The coated microspheres were then sieved through a U.S. Standard 20-mesh 8-inch test sieve to remove the agglomerates present and 129 pbw of final product was recovered. The product appeared to be well coated with the hydrophobic silica. The product had a light gray color, and was free flowing. True density was 0.872 g/cc.

EXAMPLE 5

One hundred pbw of Extendospheres SLG white hollow ceramic microspheres from PQ Corporation were placed in a polypropylene beaker. Eight pbw of Spensol L54 urethane emulsion was mixed with 2 pbw of water in another beaker. Approximately ⅓ of this mixture was added to the microspheres, and a spatula was used to agitate them vigorously. The microspheres began to take on a damp appearance. Forty Pbw of QUSO WR55 hydrophobic silica was placed in a beaker, and approximately ⅓ of this powder was added to the damp microspheres. Sufficient methanol was added to wet out the QUSO. Agitation was continued until the microspheres began to appear dry. Another third of the L54/water mixture was added to the microspheres, agitation was again performed until a damp appearance was effected, then another third of the hydrophobic silica was added. Agitation was once again initiated, and sufficient methanol was introduced to wet out the QUSO. The last third of the L54/water mixture was then added, the microspheres agitated, and the last third of the silica was added after the damp appearance was once again achieved. The microspheres, which appeared to be somewhat damp even with considerable agitation, were heated in a shallow layer in a laboratory convection oven. The temperature control was set at 250° F., and the coated microspheres were allowed to dry thoroughly with occasional stirring. The product was removed from the oven and allowed to cool to ambient temperature. The coated microspheres were then sieved through a U.S. Standard 20-mesh 8-inch test sieve to remove the agglomerates present. One hundred twenty-two pbw of final product was recovered. The product appeared to be well coated with the hydrophobic silica. The product had a white color and was free flowing. True density was 0.868 g/cc.

EXAMPLE 6

The products made by the processes described in Examples 4 and 5 were tested as defoamers for a paper mill black liquor. The products were dispersed in mineral oil along with a commercially available defoaming agent. These agents were tested in a standard test wherein black liquor is recirculated in a graduated column that generates a foam, and the relative foam height is measured at various times. The foam height of the commercial product was found to be about 145. The product of Examples 4 and 5 had foam heights of about 150. The blank generated a foam height of 260.

EXAMPLE 7

The product made as described in Example 1 was used to remove calcium ions from hard water. The product was added to agitating simulated hard water. The agitation was continued for 15 minutes. After the agitation was stopped the zeolite-impregnated microspheres floated to the top of the vessel and were separated from the solution. The concentration of calcium decreased by the amount predicted by the ion exchange capacity of the zeolite contained in the Example 1 product.

We claim:

1. A process for contacting an active material selected from the group consisting of adsorbents, catalysts, defoamers and ion exchangers with a liquid, comprising the steps of:
   a. contacting a composite particle with a liquid under sufficient agitation to disperse the composite particles throughout the volume of the liquid, said composite particles having a density of 60 to 90% of the liquid, said composite particles consisting of a hollow microsphere with a density of about 0.1 to about 0.9 g/cc and an average particle size of about 60 to about 180 microns, and particles of said active material bound to said hollow microsphere with an adhesive and having an average particle size of less than about 25 microns and being selected from the group consisting of activated carbon, zinc oxide, silica gel, magnesium oxide, magnesium silicate, polyvinyl polypyrollidone, zeolites, ferrites, hydrophobic silica, silica supported metal organic polymers, silica supported metal oxides, silica-titania co-gels, metal phosphates, imbiber beads and mixtures thereof, said adhesive being nay that will bind the active particles to the hollow microsphere, does not promote agglomeration of the hollow microspheres, is not soluble in and does not react with the liquid in contact with the composite particle;
   b. maintaining agitation and contact for a time sufficient to interact with the liquid;
   c. stopping the agitation;
   d. allowing the composite particle to float to the top of the liquid; and
   e. separating the composite particle from the liquid.

2. The process of claim 1 wherein the composite particle comprises:
   a. 10 to 35% by weight of active material particles with an average particle size of about 0.4 to about 10 microns;
   b. 2 to 15% by weight of adhesive binder; and
   c. 55 to 87% by weight of microspheres with an average particle size about 100 to about 180 microns.

3. A process for contacting an active material selected from the group consisting of adsorbents, catalysts, defoamers and ion exchangers with a liquid, comprising the steps of:
   a. contacting a composite particle with a liquid under sufficient agitation to disperse the composite particles throughout the volume of the liquid said composite particles having a density of 60 to 90% of the liquid, said composite particle consisting of a hollow fly ash microsphere with a density of about 0.1 to about 0.9 g/cc and an average particle size of about 60 to about 180 microns and particles of said active material bound to said hollow fly ash microsphere with an adhesive and having an average particle size of less than about 25 microns and being selected from the group consisting of activated carbon, zinc oxide, silica gel, magnesium oxide, magnesium silicate, polyvinyl polypyrollidone, zeolites, ferrites, hydrophobic silica, silica supported metal organic polymers, silica supported metal oxides, silica-titania co-gels, metal phosphates, imbiber beads and mixtures thereof, said adhesive being any that will bind the active particles to the hollow fly ash microsphere, does not promote agglomeration of the hollow fly ash microspheres, is not soluble in and does not react with the liquid in contact with the composite particle;
   b. maintaining agitation and contact for a time sufficient to interact with the liquid;
   c. stopping the agitation;
   d. allowing the composite particle to float to the top of the liquid; and
   e. separating the composite particle from the liquid.

4. A process for contacting an active material selected from the group consisting of adsorbents, catalysts, defoamers and ion exchangers with a liquid, comprising the steps of:
   a. contacting a composite particle with a liquid under sufficient agitation to disperse the composite particles throughout the volume of the liquid, said composite particles having a density of 60 to 90% of the liquid, said composite particle consisting of 55 to 87% by weight of a hollow fly ash microsphere with a density of about 0.1 to about 0.9 g/cc and an average particle size of about 60 to about 180 microns and 10 to 35% by weight of particles of said active material bound to said hollow fly ash microsphere with 2 to 15% by weight of an adhesive and having an average particle size of less than about 25 microns and being selected from the group consisting of activated carbon, zinc oxide, silica gel, magnesium oxide, magnesium silicate, polyvinyl polypyrollidone, zeolites, ferrites, hydrophobic silica, silica supported metal organic polymers, silica supported metal oxides, silica-titania co-gels, metal phosphates, imbiber beads and mixtures thereof, said adhesive being any that will bind the active particles to the hollow fly ash microsphere, does not promote agglomeration of the hollow fly ash microspheres, is not soluble in and does not react with the liquid in contact with the composite particle;
   b. maintaining agitation and contact for a time sufficient to interact with the liquid;
   c. stopping the agitation;
   d. allowing the composite particle to float to the top of the liquid; and
   e. separating the composite particle from the liquid.

* * * * *